(12) United States Patent
Hughes et al.

(10) Patent No.: US 7,186,963 B2
(45) Date of Patent: Mar. 6, 2007

(54) ENVIRONMENT RADIATION DETECTOR HAVING A VISUAL IMAGE CAPTURING DEVICE

(75) Inventors: Karl Anthony Hughes, Cumbria (GB); John Adrian Lightfoot, Cumbria (GB); Andrew Stuart Chesterman, Cumbria (GB)

(73) Assignee: BNFL (IP) Ltd., Warrington (GB)

( * ) Notice: Subject to any disclaimer, the term of this patent is extended or adjusted under 35 U.S.C. 154(b) by 246 days.

(21) Appl. No.: 10/493,907

(22) PCT Filed: Nov. 27, 2002

(86) PCT No.: PCT/GB02/05348

§ 371 (c)(1),
(2), (4) Date: Dec. 16, 2004

(87) PCT Pub. No.: WO03/046611

PCT Pub. Date: Jun. 5, 2003

(65) Prior Publication Data

US 2006/0208154 A1    Sep. 21, 2006

(30) Foreign Application Priority Data

Nov. 27, 2001   (GB) ................................. 0128361.3

(51) Int. Cl.
*H01L 27/00*       (2006.01)
(52) U.S. Cl. .................. 250/208.1; 250/559.4
(58) Field of Classification Search ............ 250/208.1, 250/559.4, 221, 554, 370.08; 356/70, 71, 356/72; 340/539.26, 555–557
See application file for complete search history.

(56) References Cited

U.S. PATENT DOCUMENTS

| | | |
|---|---|---|
| 3,270,205 A | 8/1966 | Ladd et al. |
| 4,187,908 A | 2/1980 | Fertl et al. |
| 4,424,446 A | 1/1984 | Inbar |
| 4,562,353 A | 12/1985 | Del Medico |

(Continued)

FOREIGN PATENT DOCUMENTS

EP    0 542 561 A1    5/1993

(Continued)

OTHER PUBLICATIONS

R. Redus et al., *An Imaging Nuclear Survey System*, IEEE Transactions On Nuclear Science, vol. 43, No. 3, Jun. 1996, pp. 1827-1831.

(Continued)

*Primary Examiner*—Que T. Le
(74) *Attorney, Agent, or Firm*—Workman Nydegger

(57) ABSTRACT

A method of obtaining information about radiation arising from within an environment includes providing a directionally sensitive radiation detector which has a field of view and providing a visual image capturing device which has an area of vision. The radiation for a field of view is measured, the field of view including a part of the environment. The measurement of radiation is recorded together with an indication of the space or position of the respective field of view relative to the detector. A visual image of an area of vision is obtained, the area of vision including the part of the environment within the field of view. The image is recorded together with an indication of the spatial position of that field of view relative to the detector. Selecting the set of data from the measurement of radiation according to a criteria set after completion of the measurements of radiation. The information is overlaid from one or more of the measurements of radiation with one of the visual images.

14 Claims, 11 Drawing Sheets

U.S. PATENT DOCUMENTS

| | | | |
|---|---|---|---|
| 4,692,624 A | | 9/1987 | Ichihara |
| 4,791,300 A | * | 12/1988 | Yin ........................ 250/363.01 |
| 4,827,132 A | | 5/1989 | Moscovitch |
| 5,204,533 A | | 4/1993 | Simonet |
| 5,286,973 A | | 2/1994 | Westrom et al. |
| 5,479,017 A | | 12/1995 | Yamada et al. |
| 5,936,240 A | | 8/1999 | Dudar et al. |
| 6,528,797 B1 | | 3/2003 | Benke et al. |

FOREIGN PATENT DOCUMENTS

| | | |
|---|---|---|
| EP | 0 743 538 A2 | 11/1996 |
| WO | WO 98/52071 | 11/1998 |

OTHER PUBLICATIONS

A. V. Chesnokov et al., *Determination of Surface Activity and Radiation Spectrum Characteristics Inside Buildings by a Gamma Locator*, Nuclear Instruments and Methods in Physics Research A, vol. 401, 1997, pp. 414-420.

G. Cho et al., *Electronic Dose Conversion Technique Using a NaI (TI) Detector for Assessment of Exposure Dose Rate from Environmental Radiation*, IEEE Transactions on Nuclear Science, vol. 45, No. 3, Jun. 1998, pp. 981-985.

Roger Y. Tsai, A Versatile Camera Calibration Technique for High-Accuracy 3D Machine Vision Metrology Using Off-the-Shelf TV Cameras and Lenses, *IEEE Journal of Robotics and Automation*, vol. RA-3, No. 4, Aug. 1987, pp. 323-345.

O. Sima, *Applications of Monte Carlo Calculations to Gamma-spectrometric Measurements of Environmental Samples*, Applied Radiation and Isotopes, Pergamon Press Ltd., vol. 47, No. 9-10, Sep. 10, 1996, pp. 919-923.

Abstract of Japanese Patent Publication No. 03092788, published Apr. 17, 1991.

Karl A. Hughes et al., *Upgrading the Radscan™ 600 GAMMA Scanner to Produce Dose Maps in Three Dimensions*, The 5th International Conference on Nuclear Engineering, May 26-30, 1997.

Karl Hughes et al., *Activity Assessment*, BNFL Commercial, Issue 1, Technical Report, Apr. 9, 2001.

* cited by examiner

Operator's Co-ordinate System

Spherical Polar Co-ordinate and the Video Game

| Variable | Type | Meaning / Comments |
|---|---|---|
| p | Calculated | Current pan angle in degrees (operator) |
| t | Calculated | Current tilt angle in degrees (operator) |
| ip | Calculated | Current pan angle in the inverted position (operator) |
| it | Calculated | Current tilt angle in the inverted position (operator) |
| vp | Calculated | Pan angle of centre of current video frame in spherical polars |
| vt | Calculated | Tilt angle of centre of current video frame in spherical polars |
| wh | Calculated | Half zoom width at distance dmr |
| hh | Calculated | Half zoom height at distance dmr |
| dmr | Calculated | Distance of measurement point along y axis |
| zu | Calculated | Upper extent of video frame |
| zd | Calculated | Lower extent of video frame |
| xl | Calculated | Left extent of video frame |
| xr | Calculated | Right extent of video frame |
| tp | Measured | Pan transducer output |
| mp | Constant | Pan slope |
| cp | Constant | Pan intercept |
| tt | Measured | Tilt transducer output |
| mt | Constant | Tilt slope |
| ct | Constant | Tilt intercept |
| zoom | Calculated | Zoom angle in degrees |
| tz | Measured | Zoom transducer output |
| mz | Constant | Zoom 1st order constant |
| nz | Constant | Zoom 2nd order constant |
| cz | Constant | Zoom intercept |
| xoff | Constant | Parallax offset of camera in x direction |

FIG. 6

| | | |
|---|---|---|
| yoff | Constant | Parallax offset of camera in y direction |
| zoff | Constant | Parallax offset of camera in z direction |
| minz | Constant | Minimum allowed zoom value in units of tz |
| maxz | Constant | Maximum allowed zoom value in units of tz |
| r | Calculated | Range in meters |
| tr | Measured | Range transducer output |
| cr | Constant | Range intercrpt |
| ur | Constant | User input range |
| croi(n) | Measured | Count in nth ROI |
| cr(n) | Calculated | Count rate in nth ROI |
| cra(n) | Calculated | Average count rate in nth ROI |
| crr(n) | Calculated | Corrected count rate in nth ROI |
| crar(n) | Calculated | Average corrected count rate in nth ROI |
| crur(n) | Calculated | User range corrected count rate in nth ROI |
| craur(n) | Calculated | Averaged, user range corrected count rate in nth ROI |
| rref | Constant | The input range to which count rates are corrected |
| ff | Constant | Factor to correct the count rate |
| ecr(n) | Calculated | Error on the count rate in nth ROI |
| ecra(n) | Calculated | Error on the averaged count rate in nth ROI |
| lt | Measured | Live time |
| lta | Measured | Live time for an averaged measurement |
| topt | Measured | Top tilt angle |
| bottomt | Measured | Bottom tilt angle |
| leftp | Measured | Left pan angle |
| rightp | Measured | Right pan angle |
| maxp | Constant | Maximum pan software end stop |
| minp | Constant | Minimum pan software end stop |

FIG. 6 Cont.

| | | |
|---|---|---|
| maxt | Constant | Maximum tilt software end stop |
| mint | Constant | Minimum tilt software end stop |
| me | Constant | Energy calibration slope |
| ce | Constant | Energy calibration intercept |
| rd | Calculated | Rapid Dose |
| rdr | User input | Range for Rapid Dose |
| dt | Constant | Dwell time for an automatic scan |
| spp, spt | Calculated | Pan and tilt angles in spherical polars |
| ispp, ispt | Calculated | Pan and tilt angles in spherical polars inverted |
| angdi | Calculated | Angular distance between a pixel and a measurement point |
| ppsp | Calculated | Spherical polar co-ordinates of a pixel (pan) |
| ptsp | Calculated | Spherical polar co-ordinates of a pixel (tilt) |
| prsp | Calculated | Spherical polar co-ordinates of a pixel (range) |
| wt | Constant | Weight threshold for overlay plot |
| hp | Calculated | Fractional pixel position in height |
| wp | Calculated | Fractional pixel position in width |
| tm | Calculated | Tilt angle of measurement point m in spherical polars |
| pm | Calculated | Pan angle of measurement point m in spherical polars |
| wm | Calculated | Width co-ordinate of measurement on video frame |
| hm | Calculated | Height co-ordinate of measurement on video frame |
| valp | Calculated | Plotted value at a pixel |
| xp, yp, zp | Calculated | Cartesian co-ordinate of pixel (rotated) |
| xd, yd, zd | Calculated | Cartesian co-ordinate of pixel (non-rotated) |
| xm, ym, zm | Calculated | Cartesian co-ordinate of measurement point |
| xmr, ymr, zmr | Calculated | Cartesian co-ordinate of measurement point rotated |
| SPP(n) | Calculated | Scanning pitch in pan |
| tt | Constant | Scan threshold top |

FIG. 6 Cont.

| | | |
|---|---|---|
| bt | Constant | Scan threshold bottom |
| nhp | Constant | Number of horizontal pixels |
| nvp | Constant | Number of vertical pixels |
| Nscan | Calculated | The no. of points in an automatic scan |
| Ntilt, Npan | Calculated | The no. of lines of tilt and pan in an automatic scan |
| Ntiltrem | Calculated | The no. of complete lines of tilt remaining in an automatic scan |
| Npanrem | Calculated | The no. of complete lines of pan, on the current line of tilt remaining in an automatic scan |
| trem | Calculated | The time remaining to the end of an automatic scan |
| F1, F2, F3 | Constant | Calibration constants for remaining scan time |

FIG. 6  Cont.

| X | Q | Q | X | Q | Q | X | Q | Q | X | Q |
|---|---|---|---|---|---|---|---|---|---|---|
| Q | Q | Q | Q | Q | Q | Q | Q | Q | Q | Q |
| Q | X | Q | $Q_1$ | Q | $X_2$ | $X_3$ | Q | X | Q | Q |
| X | Q | X | $X_1$ | Q | X | Q | X | Q | Q | X |
| Q | X | Q | Q | X | Q | X | Q | $X_4$ | Q | X |

ENVIRONMENT RADIATION DETECTOR HAVING A VISUAL IMAGE CAPTURING DEVICE

BACKGROUND OF THE INVENTION

1. Field of the Invention

This invention concerns improvements in and relating to instruments for detecting radiation, particularly but not exclusively, in relation to instruments for determining count rate, dose or other factors relating to radiation within an environment, particularly gamma radiation.

2. Relevant Technology

A range of instruments presently exist for investigating radiation within an environment, particularly contamination thereof. In general, these instruments establish count rates for fields of view of radiation detectors.

SUMMARY OF THE INVENTION

There exists a need for greater versatility in terms of the types of investigation which can be performed and/or the manner in which they are performed and/or the manner in which the results are processed. There also exists a need for improved speeds in investigating environments and/or enhancement in the levels of data collected. There also exists a need for improved display of the results from such investigations. There also exists a need for improved processing techniques for generating the desired output form from the measurements made. The present invention aims to address one or more of these issues.

According to a first aspect of the invention we provide a method for obtaining information about radiation arising from within an environment, the method including:

providing a directionally sensitive radiation detector which has a field of view;

providing a visual image capturing device which has an area of vision;

providing the directionally sensitive radiation detector and the visual image capturing device on a pan and tilt unit in sight of at least part of the environment;

specifying a portion of the environment to be considered;

conducting a measurement of the radiation in each of a plurality of fields of view, each field of view including a part of the environment within the specified portion of the environment, all parts of the specified portion being included in at least one field of view;

recording the measurements of radiation together with an indication of the spatial position of the respective field of view relative to the detector;

obtaining a visual image for each measurement of radiation, the area of vision of the images including the respective part of the environment that lies within the respective field of view and those images being recorded together with an indication of the spatial position of the areas of vision; and information from one or more of the measurements of radiation being overlain with one of the visual images.

Preferably the plurality of fields of view are considered in a continuous sequence. Preferably the plurality of fields of view are considered in an automatic sequence. Preferably a measurement of the radiation for a field of view is automatically followed by a measurement of the radiation for another field of view, ideally an adjoining field of view, with this process being repeated throughout the specified portion.

Preferably the portion of the environment to be considered is specified by pointing the directionally sensitive radiation detector at a first field of view and at a second field of view, the specified portion thereby being defined between the two. The first field of view and the second field of view may be supplemented by one or more other fields of view which specify the portion of the environment to be considered. A first field of view and second field of view which are defined may lead to a third limit on the specified portion being defined by a point having the same pan angle as the first field of view and the same tilt angle as the second field of view. Preferably a fourth point having the same pan angle as the second field of view and the same tilt angle as the first field of view is used to define the specified portion of the environment.

Preferably the plurality of fields of view are considered in a continuous operation with the fields of view stepping from one field of view to the next.

Preferably the visual image for each measurement of radiation is obtained whilst the radiation detector is pointed at the respective field of view. The visual image may be obtained prior to and/or during and/or after the measurement of radiation for a particular field of view.

The first aspect of the invention may include any of the features, options or possibilities set out elsewhere in this document.

According to a second aspect of the invention we provide a method for obtaining information about radiation arising from within an environment, the method including:

providing a directionally sensitive radiation detector which has a field of view;

providing a visual image capturing device which has an area of vision;

providing the directionally sensitive radiation detector and the visual image capturing device on a pan and tilt unit in sight of at least part of the environment;

specifying a portion of the environment to be considered;

conducting a measurement of the radiation in each of a plurality of fields of view, each field of view being centred on a measurement point, the number of measurement points decreasing with tilt angle according to the cosine of the angle of tilt relative to an equatorial plane, each field of view including a part of the environment within the portion to be considered, all parts of the portion of the environment being considered being included in at least one field of view;

recording the measurements of radiation together with an indication of the spatial position of the respective field of view relative to the detector;

obtaining visual images of one or more areas of vision, the areas of vision including all of the specified portion of the environment being included in at least one of the areas of vision and those images being recorded together with an indication of the spatial position of the areas of vision; and information from one or more of the measurements of radiation being overlain with one of the visual images.

Preferably the equatorial plane represents an horizontal plane.

Preferably no radiometric measurements are made at a tilt angle of +/−90°.

Preferably the pitch between different fields of view is constant for a given collimator. Preferably the scanning pitch is expressed in degrees.

Preferably the scanning interval in pan is:—

$$\text{scanning interval in pan} = \frac{\text{scanning pitch in degrees}}{\sin t}$$

where t is the tilt angle relative to the equatorial plane.

Preferably the measurement points have predetermined spatial positions.

The second aspect of the invention may include any of the features, options or possibilities set out elsewhere in this document.

According to a third aspect of the invention we provide a method for obtaining information about radiation arising from within an environment, the method including:

providing a directionally sensitive radiation detector which has a field of view;

providing a visual image capturing device which has an area of vision;

providing the directionally sensitive radiation detector and the visual image capturing device on a pan and tilt unit in sight of at least part of the environment;

specifying a portion of the environment to be considered;

conducting a measurement of the radiation in each of a plurality of fields of view, each field of view being centred on a measurement point, the measurement points having a predefined spatial position relative to the detector, at least those measurement points falling within the specified portion of the environment being used for a measurement, each field of view including a part of the environment within the specified portion, all parts of the portion of the environment being considered being included in at least one field of view;

recording the measurements of radiation together with an indication of the spatial position of the respective field of view relative to the detector, obtaining visual images of one or more areas of vision, the areas of vision including all of the specified portion of the environment being included in at least one of the areas of vision and those images being recorded together with an indication of the spatial position of the areas of vision; and information from one or more of the measurements of radiation being overlain with one or more of the visual images.

The measurement points may have predefined spatial positions relative to an equatorial plane. The measurement points may have predefined spatial positions relative to a plane at 90° to the equatorial plane. Preferably an initial point is defined, ideally on the intersection of the equatorial plane and the perpendicular plane. Preferably the other points are predefined relative to that point by the relationship interval in pan in degrees equals scanning pitch in degrees divided by sin t, where t is the tilt angle relative to the equatorial plane. The interval in tilt may be equal to the scanning pitch.

Preferably all those measurement points falling with the specified portion of the environment are used for a measurement. Measurements may be performed for one or more points adjacent to the specified portion.

The third aspect of the invention may include any of the features, options or possibilities set out elsewhere in this document.

According to a fourth aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment;

recording the measurement of radiation together with an indication of the spatial position of the respective field of view relative to the detector, the recorded measurement including a sub measurement of the radiation in each of a plurality of energy ranges spread across the range 50 keV to 1300 keV;

obtaining a visual image of an area of vision, the area of vision including the part of the environment within the field of view and recording that image together with an indication of the spatial position of that field of view relative to the detector; and information from one or more of the measurements of radiation being overlain with one of the visual images.

Preferably at least 20 energy ranges are used, more preferably at least 50 energy ranges are used, still more preferably at least 100 energy ranges are used and ideally more than 200 energy ranges are used. Preferably the energy ranges are contiguous with one another. Preferably the energy ranges cover the range at most 50 keV to at least 1300 keV. More preferably the energy ranges cover the range at most 30 keV to at least 1500 keV. Preferably the recorded measurement is a series of sub-measurements, a sub-measurement being taken for each of the plurality of energy ranges.

The fourth aspect of the invention may include any of the features, options or possibilities set out elsewhere in this document.

According to a fifth aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment;

recording the measurement of radiation together with an indication of the spatial position of the respective field of view relative to the detector;

obtaining a visual image of an area of vision, the area of vision including the part of the environment within the field of view and recording that image together with an indication of the spatial position of that field of view relative to the detector, and selecting, after completion of the measurement of radiation, a set of data from the measurements of radiation according to a criteria, the criteria also being set after completion of the measurements of radiation; and information from one or more of the measurements of radiation being overlain with one of the visual images.

The selection of a set of data may occur upon completion of the measurements of radiation. The selection of a set of data may occur a significant time after completion of the measurements of radiation, for instance at least an hour after completion and/or at least six hours after completion and/or at least a day after completion. The set of data may be selected after the measurements of radiation have been recorded to a writeable medium, for instance a CD-ROM. The selection of the set of data may occur after the measurements of radiation have been conveyed from the instrument to a remote data processing location.

The criteria may be set as an initial step to the selection of the set of data. The criteria may be set by the operator of the instrument. The criteria may be set by the operator of the processing software. The criteria may be one or more energy ranges for radiation. Where a plurality of ranges are selected, the ranges may be separate from one another, contiguous from one another, or overlap with one another. The range or ranges may correspond to one or more range or ranges for which sub-measurements are taken during the measurements of radiation. The energy range may be specified to investigate a particular isotope. The energy range may be specified to investigate a particular energy of emissions by an isotope.

The criteria may be one of a list of predetermined criteria available for selection. The criteria may be a new criteria defined at the time the criteria is set.

The criteria may be a radiation measurement threshold. The criteria may be a count rate, for instance count rates of a threshold value or higher, or count rates of a threshold or lower. The set data selected may be both fields of view for which the measurement of radiation matches and/or exceeds the threshold defined by the criteria. The set of data selected may be the fields of view to which the measurements of radiation match and/or are below the thresholds specified in the criteria. The criteria may be compared against the measurement of radiation for a field of view at all energies and or at one or more selected energy ranges.

Preferably an indication is provided as to those fields of view for which the criteria are met. The indication may be an numerical indication, but is more preferably a visual indication, for instance a video image including the part of the environment relating to the field of view for which the criteria are met.

The fifth aspect of the invention may include any of the features, options or possibilities set out elsewhere in this document.

According to a sixth aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment;

recording the measurement of radiation together with an indication of the spatial position of the respective field of view relative to the detector;

obtaining a visual image of an area of vision, the area of vision including the part of the environment within the field of view and recording that image together with an indication of the spatial position of that field of view relative to the detector; and setting an energy range for detected radiation after the completion of the measurements of radiation;

then obtaining from the radiation measurements a measure of the radiation in that energy range; and overlaying an indication of the value for that energy range for a field of view with the part of the visual image corresponding to that field of view.

The sixth aspect of the invention may include any of the features, options or possibilities set out elsewhere in this document, particularly in relation to the fifth aspect of the invention.

According to a seventh aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment;

recording the measurement of radiation together with an indication of the spatial position of the respective field of view relative to the detector;

obtaining a visual image of an area of vision, the area of vision including the part of the environment within the field of view and recording that image together with an indication of the spatial position of that field of view relative to the detector;

the measurement of radiation and the image being distinctly recorded; and information from one or more of the measurements of radiation being overlain with one of the visual images.

Preferably the measurement of radiation and the image are each recorded in association with the indication of the spatial position. Preferably the measurement of radiation and the image are recorded without being associated with one another.

The seventh aspect of the invention may include any of the features, options or possibilities set out elsewhere in this document.

According to a eighth aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment, for each of a plurality of fields of view;

recording the measurement of radiation together with an indication of the spatial position of the respective field of view relative to the detector in each case;

obtaining a visual image of an area of vision, the area of vision including the part of the environment within the field of view of at least two of the fields of view and recording that image together with an indication of the spatial position of that field of view relative to the detector; and after completion of measurements, selecting a visual image and overlaying that visual image with radiation measurements from a plurality of fields of view.

Preferably measurements of the radiation are conducted for at least five fields of view, more preferably at least ten fields of view, still more preferably at least twenty fields of view, and ideally at least fifty fields of view. Preferably the visual image is overlaid with radiation measurements for all fields of view which include a part of the environment which is within the area of vision of the selected visual image.

Preferably fields of view are overlain for which a vector extending from the intersection of the centre line of the field of view with the part of the environment to the radiation detector passes through the selected visual image.

Preferably the Cartesian coordinates of the intersection between the centre line of a field of view and the part of the environment are obtained and are adjusted to account for the radiation detector orientation. Preferably the adjustment is by rotation. Preferably those measurements of radiation for measurement points behind the detector are discounted from further processing.

Preferably the positioning of the measurements of radiation in the overlay is adjusted for parallax effects. X and/or Y and/or Z axis offsets may be accounted for.

Preferably the range of the measurement point is determined. The determination may be by measurement or a user inputted value. Preferably a virtual plane, perpendicular to the centre line of the image capture device is provided and with outer limits determined by the area of vision. Preferably the virtual plane is at the range distance from the detector. Preferably the ratio of the extent of the plane above the measurement point to the extent of the plane below the measurement point is considered. Preferably the measurement point is plotted at an equivalent ratio of extents within the video image.

The eighth aspect of the invention may include any of the features, options or possibilities set out elsewhere in this document.

According to a ninth aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment, for a plurality of fields of view;

recording the measurement of radiation together with an indication of the spatial position of the respective field of views relative to the detector;

obtaining one or more visual images, each with an area of vision and recording those images together with an indication of the respective spatial position of the field of view relative to the detector;

the measurement of radiation and the image being distinctly recorded; and after completion of measurements, selecting a visual image and considering the recorded measurements of radiation, those measurements of radiation which relate to a part of the environment within the bounds of the visual image being selected and overlain with the visual image.

The ninth aspect of the invention may include any of the features, options or possibilities set out elsewhere in this document with particular reference to the eighth aspect of the invention.

According to a tenth aspect of the invention we provide a method for obtaining information about radiation arising from within an environment, the method including:

providing a directionally sensitive radiation detector which has a field of view;

providing a visual image capturing device which has an area of vision;

conducting a measurement of the radiation for a field of view, the field of view including a part of the environment, for a plurality of fields of view;

recording the measurement of radiation together with an indication of the spatial position of the respective field of views relative to the detector;

obtaining a plurality of visual images, each with an area of vision, the areas of vision each including the part of the environment within the field of view of at least two of the fields of view and recording those images together with an indication of the respective spatial position of the field of view relative to the detector;

after completion of measurements, selecting a first visual image and overlaying the first visual image with measurements from a plurality of fields of view which relate to a part of the environment within the area of vision of that first image, one or more of the data points in the overlay being a representation of a value interpolated from the value of one or more measurements, measurements within a given range of a data point contributing to the interpolated value of that data point.

Preferably the interpolated value for a data point reflects the measured values of one or more data points. Preferably the interpolated value reflects the distance between that data point and one or more measured data points. Preferably measured data points over a cut off distance from the data point for which an interpolated value is required are excluded from the interpolation process. Preferably measured data points within a cut off distance of the data point for which an interpolated value is required are given a weighting according to their distance from the data point. Preferably the weighting is a linear weighting. Preferably the weighting declines with distance from the data point to the cut off distance, and is ideally zero at the cut off distance.

The tenth aspect of the invention may include any of the features, options or possibilities set out elsewhere in this document.

According to an eleventh aspect of the invention we provide a method for obtaining information about radiation arising from in an environment, the method including:

providing a directionally sensitive radiation detector which has a field of view;

providing a visual image capturing device which has an area of vision;

specifying a portion of the environment to be considered by measurements of radiation, a plurality of measurements being required;

specifying an extent to the area of vision of the visual image capturing device, the extent being different from the specified portion of the environment;

conducting a plurality of measurements of radiation, each measurement relating to a field of view, each field of view including a part of the environment within the specified portion, all parts of the specified portion being included in at least one field of view;

recording the measurements of radiation together with an indication of the spatial position of the respective fields of view relative to the detector;

obtaining one or more visual images, each having an area of vision, the areas of vision each including a part of the environment in a field of view, all parts of the specified portion being included in at least one area of vision;

recording the images together with an indication of the spatial position of the respective fields of view relative to the detector; and overlaying information from one or more of the measurements of radiation with one of the visual images.

The portion of the environment is preferably greater in extent than the extent of the area of vision specified. The extent may be considered in one, two, three or four directions, preferably perpendicular to one another. The extent of the area of vision may include parts of the environment outside the specified portion in one or more visual images. The area of vision may exceed the extent of the specified portion in one or more directions.

The eleventh aspect of the invention may include any of the features, options or possibilities set out elsewhere in this document.

According to a twelfth aspect of the invention we provide a method for obtaining information about radiation arising from within an environment, the method including:

providing a directionally sensitive radiation detector which has a field of view;

providing a visual image capturing device which has an area of vision;

directing the field of view of the radiation detector towards a first part of the environment to define a first limit of an investigation;

directing the field of view of the radiation detector towards a second part of the environment to define a second limit of the investigation;

conducting a measurement of the radiation in each of a plurality of fields of view, each field of view including a part of the environment between the limits of the investigation;

recording the measurements of radiation together with an indication of the spatial position of the respective field of view relative to the detector;

obtaining one or more visual images whose area of vision includes a part of the environment between the limits of the investigation, those images being recorded together with an indication of the spatial position of the areas of vision; and overlaying information from one or more of the measurements of radiation with one of the visual images.

The twelfth aspect of the invention may include any of the features, options or possibilities set out elsewhere in this document.

According to a thirteenth aspect of the invention we provide a method of presenting information about radiation arising from within an environment, the method including:

providing a directionally sensitive radiation detector which has a field of view;

providing a visual image capturing device which has an area of vision;

conducting a measurement of the radiation for a field of view, the field of view including a part of the environment, for a plurality of fields of view;

recording the measurement of radiation together with an indication of the spatial position of the respective field of views relative to the detector;

obtaining one or more visual images, each with an area of vision and recording those images together with an indication of the respective spatial position of the field of view relative to the detector;

overlaying those measurements of radiation which relate to a part of the environment within the bounds of the visual image with the visual image; and providing an indication on the visual image of those parts of the environment for which no measurements of radiation have been obtained.

The indication may be a particular colour applied to those parts of the environment for which no measurements of radiation have been obtained. The indication may be achieved by inhibiting one or the colours contributing to a pixel based colour image.

The thirteenth aspect of the invention may include any of the features, options or possibilities set out elsewhere in this document.

Any of the aspects of the invention may include the following features, options or possibilities.

The method for obtaining information may be a method for obtaining information about contamination of an environment. The method for obtaining information may be a method of locating radiation sources of an environment. The method for obtaining information may be a method of quantifying the level of emissions from one or more locations within an environment. The method of obtaining information may be a method for identifying locations within an environment limiting radiation above a threshold.

The environment may be a room, cell, vessel, process plant or part thereof.

Preferably the radiation detector is directional sensitive due to collimation. A lead, or more preferably, tungsten collimator may be used. The collimator may include one or more components of other materials, for instance stainless steel.

The field of view of the collimator may be variable. Preferably the field of view is varied by mounting different components on the collimator. The radiation detector is preferably a scintillating crystal, for instance potassium iodide or sodium iodide.

Preferably the visual image capturing device is a video camera. A still camera, particularly a digital still camera may be used. The area of vision may be determined by the zoom angle of the visual image capturing device. The area of vision may be rectilinear in shape.

Preferably the radiation detector and visual image capturing device are provided on a pan and tilt unit, ideally the same pan and tilt unit. Preferably the unit is capable of panning through at least 180° and more preferably through 300° and ideally through 360°. Preferably the tilt unit is capable of tilting through angles of at least 120°, more preferably 150° and ideally 180°.

The radiation detector and visual image capturing device may be placed in the environment. The radiation detector and visual image capturing device may be placed in sight of at least part of the environment by means of an aperture or viewport into the environment.

The portion of the environment specified for consideration may be a rectilinear part of the environment. The specified portion of the environment may include one or more walls and/or floors and/or ceilings and/or items within the environment. The items may include pipes, surfaces, shielding, vessels and the like.

Preferably the measurement of the radiation for a field of view is conducted by counting radiation detected by the radiation detector for that field of view for a period of time. Preferably the radiation detector is stationary during that count. Preferably an equivalent period of time is used for all fields of view.

Preferably the field of view is measured from one field of view to another by varying the pan and/or tilt angles.

Preferably each field of view includes a part of the specified portion of the environment. A number of fields of view in excess of ten, more preferably in excess of twenty and ideally in excess of fifty may be required to obtain information about the specified portion. Preferably one or more parts of the specified portion are included in two or more fields of view.

The measurements of radiation may be recorded to a write device, more preferably a read-write device, such as a CD-ROM. The measurements of radiation may be transmitted to a remote location and may be stored there.

Preferably the indication of the spatial position of the field of view is a pan and tilt angle.

Preferably a visual image is obtained for each measurement of radiation, ideally when the radiation detector is aligned with that field of view. Preferably the area of vision for a field of view includes all of the part of the environment for that field of view within it.

Preferably the visual images are recorded together with an indication of a pan and tilt angle for the radiation detector when the image was taken.

The measurements of radiation may be overlain with the visual images by converting the measurements of radiation into a colouration. Preferably a series of colours are used to indicate different levels of measurement of radiation. The colours and/or the colours assigned to levels of radiation may be variable.

Preferably the centre of a field of view, more particularly its intersection with part of the environment, forms a measurement point. Ideally the range to the measurement point is determined. Preferably the range to the measurement point is determined using a range finder, ideally located on the pan and tilt unit.

Preferably all parts of the specified portion are evenly measured.

BRIEF DESCRIPTION OF THE DRAWINGS

Various embodiments of the invention will now be described, by way of example only, and with reference to the accompanying drawings in which:—

FIG. 6 is a table of definitions;

DETAILED DESCRIPTION OF THE PREFERRED EMBODIMENTS

Existing Position

Figure 1:
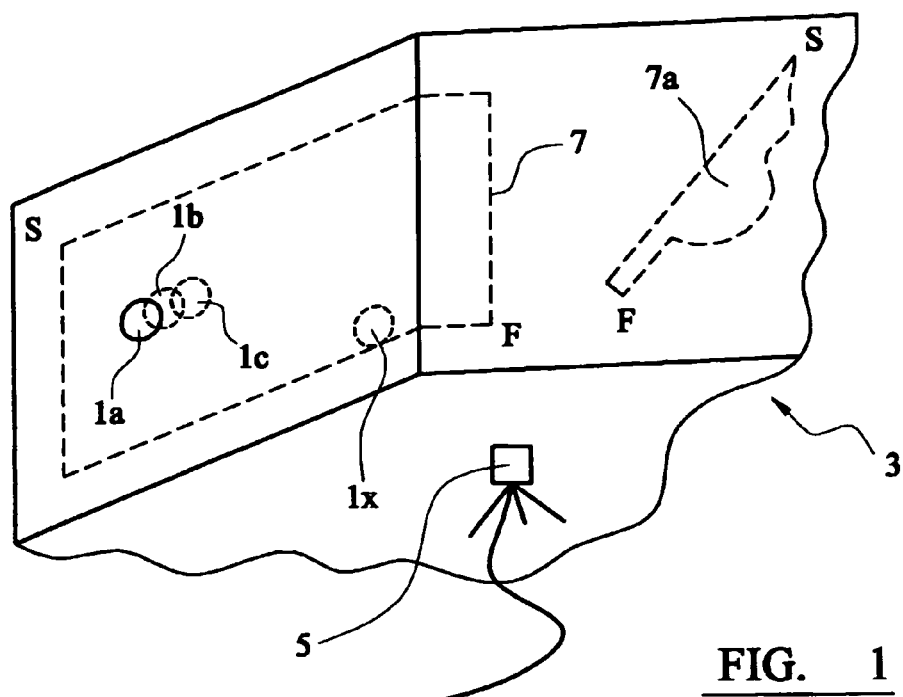
FIG. 1 is a schematic perspective view of an instrument, supporting computer systems, environment and operator.

A variety of technologies exist, both publicly available and internal, which seek to provide information on radioactive materials within an environment in a locationally informative way. In some cases this involves radiometric information, particularly count rates, in combination with a directional indication relative to the position of the instrument. In other cases, such as the applicants RADSCAN™ 700 instrument, video images and radiometric information for fields of view of a collimated radiation detector are obtained and combined. The manner in which they are obtained and can be combined is limited.

In general a video image in the form of a still frame is taken of a part of the environment. The bounds of that video image then define the area for which the radiometric information is to be obtained. A series of fields of view are then defined which substantially cover the full area of the video image using an arrangement of measurements centred on what is effectively a linear grid on the video image. Radiometric information is then obtained for each of the fields of view. The radiometric information and single video image are displayed to the operator by overlaying the radiometric measurements with the single video image so as to indicate where within that single video image radioactive contamination exists. This result can be saved in this overlain form for future review. However, the radiometric information is defined in association with the video image and hence little reprocessing of the results later is possible. If a different video image is required then the process is started again from the beginning with another full set of radiometric measurements to cover the area of the video image being required.

The radiometric measurements take the form of count rates in a preselected part or parts of the spectrum, a so called region of interest. Only a count rate for up to three regions of interest of the spectrum is measured and recorded. No recording at other energies is made. Hence only a small part of the emissions are characterised.

The fields of view for the radiation detector are overlapped by moving the detector and its associated collimator through a pan angle which is less than the field of view angle. A substantially identical number of fields of view are taken, by varying the pan angle, at each tilt angle, when considering video images and radiometric information together for overlay purposes. As a consequence a larger number of visual images and far larger number of radiometric measurements are made at high tilt angles than the applicant has now found to be necessary.

In the case of other measurement situations, such as 3D dose rate mapping, no video images are used taken or used to present the results.

If different fields of view or different video images or different regions of interest are required then the process is repeated from the beginning of the data acquisition.

EP-A-0542561 is a theoretical embodiment of such a technique, but in the form disclosed lacks critical information on how to perform certain steps. This teaching provides for the same steps in pan at any tilt followed by a change in tilt and repeat use of the same pan steps at the new tilt; an identical number of measurements being taken at each tilt. Even in the preferred form only the video images are stored for future reference.

Overview of Invention

During investigation of an environment 3, see FIG. 1, the instrument 5 is positioned at a location and at least a part of the environment 3 is considered. The extent of the video image is defined at the most suitable zoom; chosen to give the necessary level of visual detail or overview of the environment. Then the bounds of a portion 7 of the environment 3 for which radiometric information is desired are defined. The bounds of this can be entirely separate from the bounds of the video image and may be selected to give a more localised or different shape of radiometric investigation, for instance portion 7*a*. The portion 7 of the environment 3 for which radiometric measurements are needed is then considered using a series of fields of view 1*a*, 1*b*, 1*c* etc each of which include a part of the portion 7. For each of the fields of view 1*a*, 1*b*, 1*c*, etc a still image is also taken by a video camera provided by the instrument 5. The centres of the fields of view lie on predefined directions from the centre of the detector irrespective of the bounds defined for the portion 7 of the environment 3.

As a result of this configuration any portion 7 of the environment 3 which is considered is considered using a sampling regime which ensures sufficient sampling whilst avoiding over sampling and the consequential large increase in survey time required.

Each of the video images together with the pan and tilt and camera zoom angle for that image contributes to the output data. The count rates in specified regions of interest within the whole spectrum and the count rates in each of the channels which define the whole spectrum for each field of view are also outputted, together with the pan and tilt for the radiometric field of view. In practice this is the same as for the video image, but a record associated with radiometric information is made to allow entirely separate consideration of the two data sets. The range between the detector and the nearest object on the centre line of the field of view is also outputted.

The output data can be viewed during collection.

A read-write device is generally provided in association with the on-site computer to allow the output data to be permanently stored in its entirety. The read-write device facilitates recordal of the data for later consideration. The output data can be post-processed using the on-site computer, or alternatively could be conveyed to a remote computer and processed there as a result.

Importantly as all the raw data generated by the instrument is recorded and is recorded discretely far greater possibilities have been developed in terms of the functions which can be performed after data acquisition has been completed. The problems with the limited data and the necessity of applying pre-selected limits to the data which could be collected are addressed. This full data set is obtained within a manageable time frame due to appropriate sampling levels.

A key feature of data acquired in this way is that it allows video images and radiometric information to be combined rapidly with one another. This allows an operator to review one video image after another with rapid overlay of all possible radiometric information for that image irrespective of the image it was collected alongside.

The post-processing basically enables an interested person to select a video image of the environment and overlay with it all available radiometric measurements from fields of view which fall withing that video image. This is performed in a way which ensures that all contributing radiometric information is taken into account and is overlaid in the most precise manner possible. A far greater number of video images can thus be obtained and combined with radiometric information through overlays, in a practical timescale, than was possible using the prior art.

The post-processing of the data also allows different parts of the spectrum to be considered for calculation and overlaying on the video image and/or enables hot spots of radioactive material within the environment to be identified and selected for further examination by displaying the most appropriate video image and accompanying radiometric measurements for those hot spots and/or allows the entire spectrum to be considered and regions of interest within that spectrum selected after the data acquisition has been completed.

Increased versatility in terms of the type of information which can be considered and the manner in which it can be displayed is provided through the post-processing function.

The invention also fully accounts for both the offset of the video camera and the radiation detector in 3 dimensions. In prior art systems, such as EP-A-0542561, the camera and radiation detector were placed physically close to one another and the issue of parallax was ignored beyond that. Significant errors in the accuracy of the overlay can arise as a result and these too are now fully addressed by the present invention.

Instrument Configuration

Figure 2:
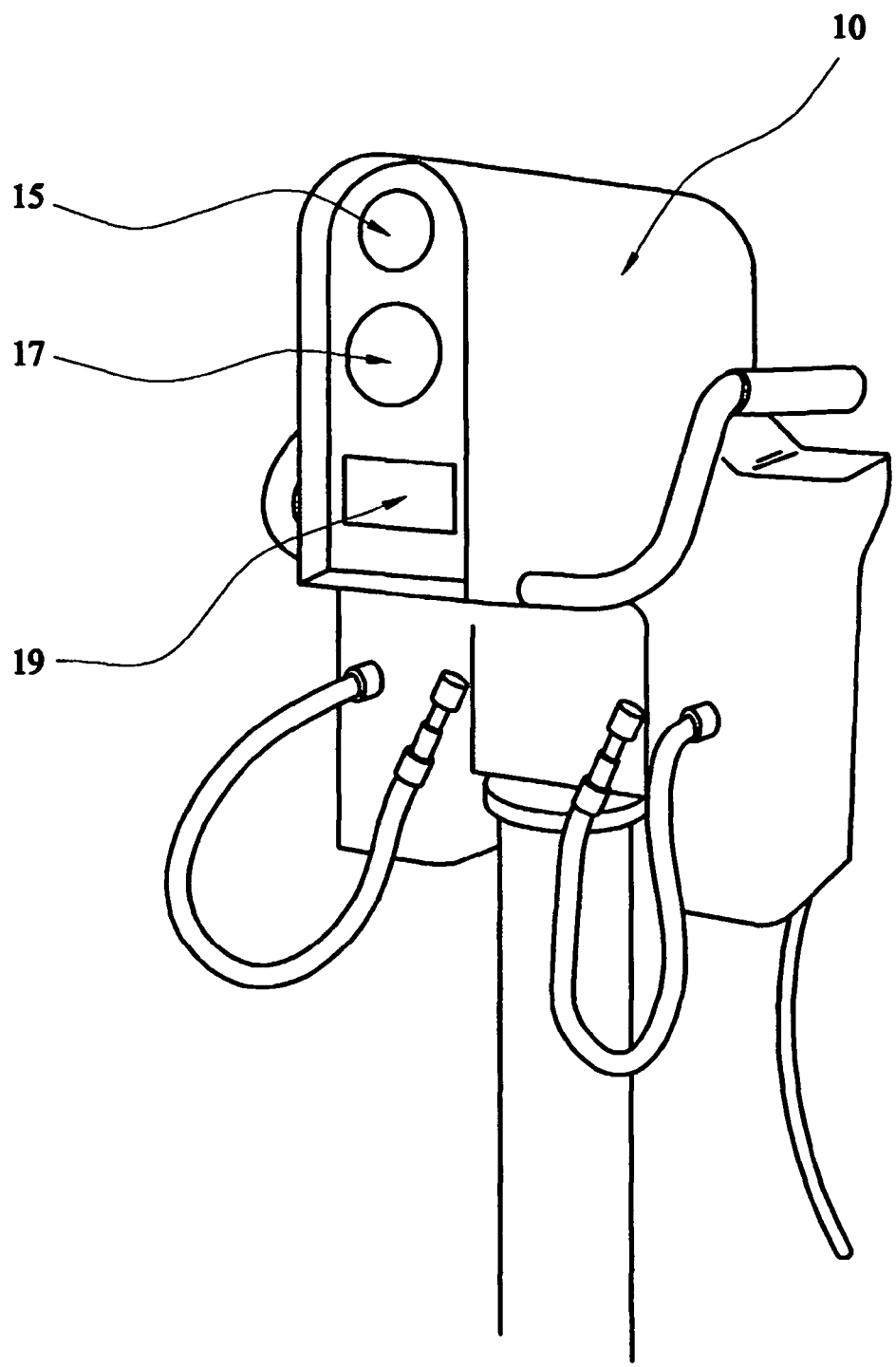
FIG. 2 is an instrument head suitable for use in the present invention.

An instrument 5 suitable for use in the present invention is illustrated in FIG. 2 and comprises an inspection head 10 which is capable of pan and tilt movement controlled manually by the operator, or automatically according to a predetermined program. The head 10 includes a video camera 15, a gamma detector 17, and a laser range finder 19. A tungsten collimated sodium iodide scintillator is preferred, but other collimating materials and/or detector materials can be employed. The tungsten collimator containing the detector has an aperture with a full plain angle width of 4° in its preferred configuration. Exchangeable collimators offering widths of 3° and 2° are also provided.

The data outputted from the instrument 5 is conveyed via a cable to the operator console. The console contains the data acquisition hardware and software; this hardware and software is also capable of the post-processing if required.

Figure 3:
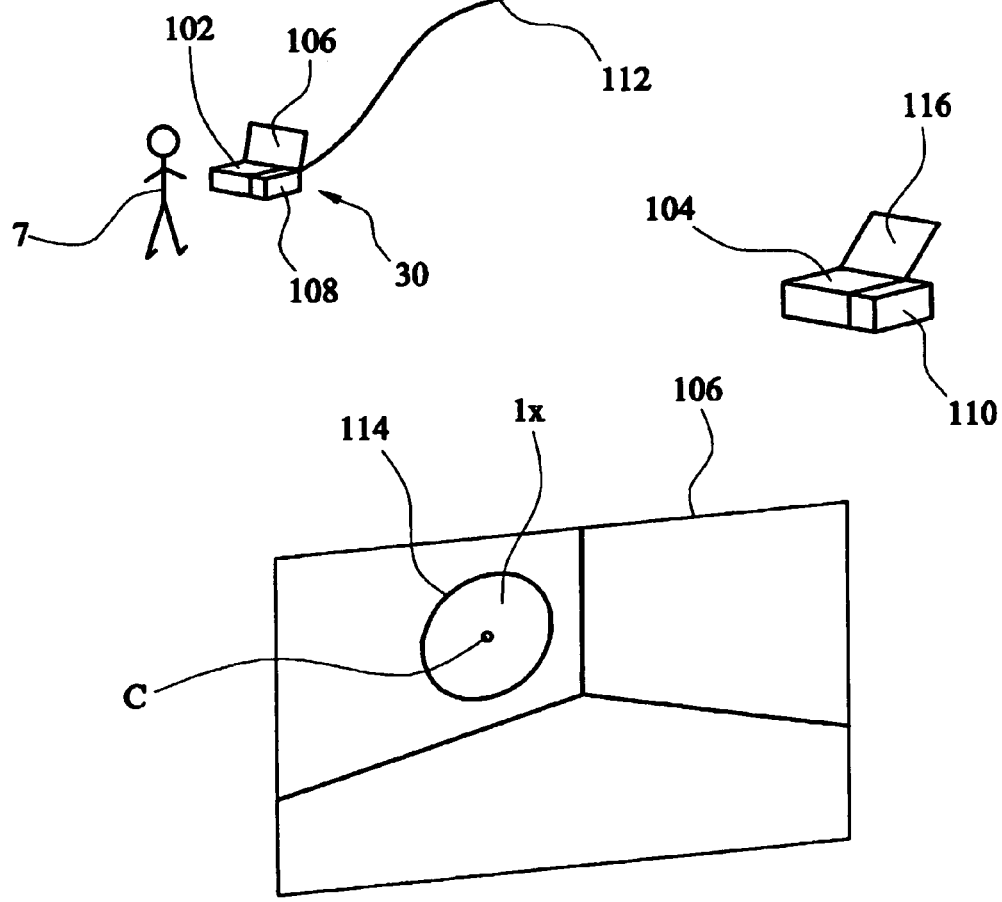
FIG. 3 is a video image of a part of the environment illustrating a field of view.

The video display 106 displays, FIG. 3, the video image from the camera 17 together with a graphic circle 114 imposed upon this video image to indicate the present field of view 1x of the collimated scintillator.

During data acquisition by the computer 102 the radiometric information obtained may also be numerically displayed for the current field of view 1x.

Whilst post-processing can be performed on the operator console, for instance during the next data acquisition run is possible to conduct such post-processing at a subsequent computer, data processing computer 104, which may be provided at an entirely different location within the same building, same plant or indeed anywhere desired in the world.

Whilst the subsequent apparatus and technique details are described with reference to the information collected by a system for the above described type, it should be realised that the invention is applicable to a wide range of radiation, particularly gamma, detecting instruments.

Data Acquisition

The data acquisition phase is operated on a personal computer 102 provided as part of the operator consol, using the Windows NT™ platform. The personal computer 102 is connected to the instrument head 10, but is sufficiently distanced from it to allow useful operation of the instrument head 10 without unnecessary exposure of the operator 7 to the environment 3 being considered.

During data acquisition the video images and radiometric measurements can be obtained through a variety of scanning techniques. In a preferred technique an automated scanning regime is employed. The scanning regime makes use of a series of predefined points which would each correspond with the centre of a field of view for the radiation detector, if that field of view were considered.

Figure 4:
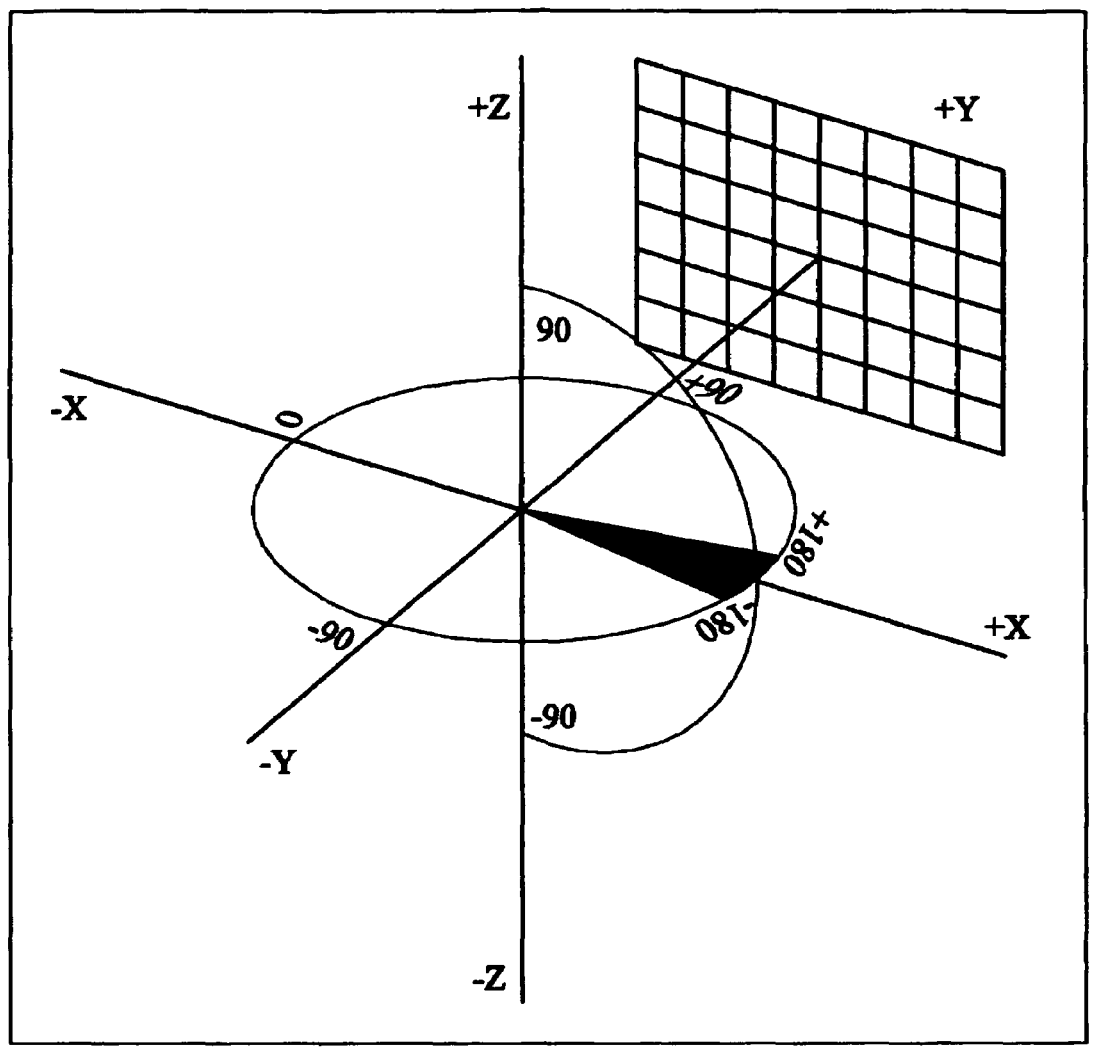
FIG. 4 shows the operator co-ordinate definitions.

The scanning pitch, SP(n), is dependent on each collimator's field of view angle, but is set at a constant for a given collimator. For a 4° full plain angle width collimator a 2° pitch is used. The scanning interval in pan in such cases is SPP(n)=SP(n)/Sin t, where t is the tilt angle in degrees. The origin of the set of pan values are set at 180° (in effect directly behind the instrument) and the pan angles are then calculated starting at 180° +/− (SPP(n)÷2)°. The pan will then increment in steps of +/− SPP(n). The tilt has its origin at +90° (i.e. vertical) with the first points at 90°+/−(SP(n)÷2) and then incremented in steps of +/−SP(n). It is preferred to avoid taking any images directly at the poles. The axises and angles involved are shown in FIG. 4, the operator's co-ordinate system.

If the whole environment is to be sampled than a radiometric measurement will be made and a video image taken with the radiation detector field of view centred on each of these points. If only a portion of the environment is being considered then only those points falling within that portion will be considered. To ensure proper coverage of the portion on occasion measurement points slightly outside the portion may be considered. The points remain the same in their positions irrespective of the extent of the portion of the environment being considered in any one case. Whatever the investigation, therefore, appropriate sampling levels are applied.

To facilitate as full an extent of sampling as possible, the instrument is allowed 180° pan in either direction about a centre line, and 80° tilt up and 60° tilt down about the horizontal or equatorial plane. These actual physical limits on the instrument head can be extended beyond these ranges if desired.

During a survey one of two types of survey is generally used.

Firstly it is possible to select an area of vision using the video camera. Measurements of radiation are then performed at each of the predetermined measurement points falling within that area of vision. The result is effective sampling of the area of vision in a short time.

Secondly it is possible to point the detector at a first field of view and then at a second field of view which defines the opposing corner of the portion of the environment to be investigated, points S and F respectively in FIG. 1. A rectilinear portion of the environment is then marked out for investigation. The other limits are the point having the same pan as point F and same tilt as point S and the point having the same pan as point S and the same tilt as point F. After this process the instrument starts an automated survey. This involves the instrument pointing the detector so that the centre of its field of view corresponds with the centre of the predetermined measurement point closest to point S. A measurement and video image is taken. The instrument is then advanced through the appropriate pan and tilt step to reach the next point and the process is then repeated over an over. In general the investigations may start at the point closest to one corner of the part of the environment and then progress to the next point along in a generally horizontal direction (but defined precisely by the pan and tilt for the predetermined measurement points), then the next and so on progressing along and down as needed. The process continues until the last point, generally the point closest to one of the other corners of the part of the environment, is reached.

The practical sampling times for collecting all the raw data and the flexibility offered by the post-processing of the data, discussed in more detail below, places fewer limitations on how the initial data acquisition process is performed. In prior art techniques the particular parts of the spectrum of interest need to be preset before a measurement, and if inappropriate selections are made then the subsequent measurements were of little value. Because of this, all prior information was generally acquired, for instance on the isotopes anticipated to be present and/or the contaminated parts of the environment. If such information was not available then more general scanning investigations were needed before video overlay type scanning operations could be performed.

In the present invention, however, these constraints on the technique have been removed, and as a consequence it is possible to set the instrument up to survey an instrument overnight without user input during the process, safe in the knowledge that the survey time is not being wasted. The optimised sampling of the environment can thus be used in all cases.

During data acquisition the data acquisition computer 102 can collect and display on the video display 106 both the actual video image received and the pan angle and tilt angle of the instrument head resulting in that video image. Also displayed on the video display 106 is a graphic circle 114 range and angle of collimator whose diameter is calculated by the data acquisition computer 102 dependent upon the zoom angle of the camera, indicating the field of view. The position of the graphic circle 114 represents the current field of view being considered for a radiometric measurement on the video image. Zooming the video camera in on part of the environment containing the field of view under consideration results in an increasing diameter graphic circle 114 being displayed. The position of the graphic circle within the rectangular video image varies depending upon the distance of the part of the environment being considered from the instrument head and the zoom angle.

Generally the date and time and any error messages or warnings are also displayed during data acquisition.

For each field of view a radiometric measurement is generated for the part of the environment which is a sub-set of that viewed in the video image. The count rate over a substantial number of channels, generally 256, is acquired for the spectrum thus generating a full energy spectrum measurement. The channels each represent a range and the ranges are contiguously provided so as to cover the full energy spectrum. Coverage between the energies 30 keV and 1500 keV is preferred. The acquisition may also include obtaining count rates for up to three regions of interest within that spectrum, which regions of interest may overlap. The count rates for the regions of interest are displayed on the video display 106 during acquisition.

Generally the date and time and any error messages or warnings are also displayed. All of this information is outputted to the data recordal medium and permanently recorded thereon.

Data Transfer

Importantly the data to be processed is all permanently stored and hence can be transferred between the data acquisition computer 102 and the data processing computer 104, if required. The video images are compressed prior to storage.

As illustrated in FIG. 1 the data processing phase of the invention can thus be carried out at a discrete and quite separate location and potentially time from the data acquisition. Post-processing of the data from a previous data acquisition phase is possible even whilst fresh data acquisition is being undertaken for another scan.

In the illustrated example a CD-ROM writer 108 is provided in the data acquisition computer 102, and this allows the data to be downloaded on to a CD-ROM which can then be transferred to the data processing computer 104 at its location. The reading unit 110 provided at the data processing computer 104 allows the data to be accessed. CD-ROMS provide a useful means for transferring, storing and providing additional copies of the data, but other data storage medium can be used.

Data transfer to the CD-ROM can occur at the end of the process or in batch writing processes during the data acquisition.

As a consequence of the data acquisition process, a large number of radiometric measurements for different fields of view are considered and the full spectrum for each is recorded. This information is recorded together with the necessary vocational information on that field of view to be able to precisely define that field of view in space and hence position the radiometric information accompanying it. Furthermore, as the video images obtained are also recorded together with the necessary vocational information the interaction between the two can be precisely allowed for, as described in more detail below. It is important that the data is recorded separately so as to allow full flexibility in the post-processing and ensure that the visual images and radiometric measurements are not tied to one another.

The provision of all of the data as being recorded and available for later processing enables a variety of advances to be made over the prior art, as described in more detail below.

Data Processing

The data processing computer 104 uses as its input the data generated by the data acquisition computer 102. In the cases where the two are separate, the data is transferred between the two in a convenient way using the read-write data storage form. Of course other communications routes such as conventional telecommunications networks can be used to transfer the data.

The data processing computer 104 does not need to be connected in any way to the instrument 5 for its function to be achieved.

The output from the data acquisition computer 102 is basically a database containing the acquired data. The database may be in an established format, for instance an Access™ database.

The database may be accessed by computer software provided within the data processing computer 104 to display the data in a couple of primary ways. In the first way the radiometric measurements are overlain with a visual image; discussed in more detail below. In the second way the radiometric measurements may be used to generate a 2D illustration of the radiometric measurements; again this is discussed in more detail below.

Video Overlay Technique

A primary function of the invention is to produce video frame radiation map overlays. This requires the selection of radiation paths from source to detector that intersect any chosen video frame and the overlay of the measurement for that path on the correct part of the video image.

In over view, a test is applied to determine whether the radiation vectors, lines from source to detector, pass through the operator-selected video frame. From a calculation of the Cartesian co-ordinates of each intersection the location on the video frame is established and the required overlay produced. As a first step the operator selects a video frame to be overlaid. From the Cartesian co-ordinates, xm, ym, zm, of each of the collected measurement points in the reference co-ordinate system, illustrated in FIG. 5 and differing from those in FIG. 4, the co-ordinates in the rotated co-ordinate system, xmr, ymr, zmr, given by the instrument head movement to point at the operated selected video frame, are determined.

Using the convention for the "forward" direction as along the +ve y-axis and yr+ve axis in the rotated system, the forward distance between the detector and each measurement point is determined. Any points that give a negative distance can be eliminated as these are by definition behind the detector/camera and will not be candidates for mapping to the video image.

At the measurement point, the video frame extents, i.e. the image size at the distance (yr−yoffset) between the camera and radiation point, are calculated using the known divergence angles of the camera. In this rotated system the xr and zr extents will be orthogonal to the yr-axis. The vertical (in reference position) offset is included in the construction of the zr extents. Comparison of the video frame co-ordinate extents xl to xr and zu to zd with the measurement point location (xmr, ymr, zmr) will allow determination of whether the measurement point falls within the frame as well as its position within the frame. A smoothing algorithm is to be used to relate the location and density of the measurement vector intersections, with measured radiation intensities and the collimator acceptance angle, to produce radiation maps.

The technique is now explained in more detail and reference is made to FIG. 6 which provides details of the meaning of the designations used in the equations.

Figure 5:
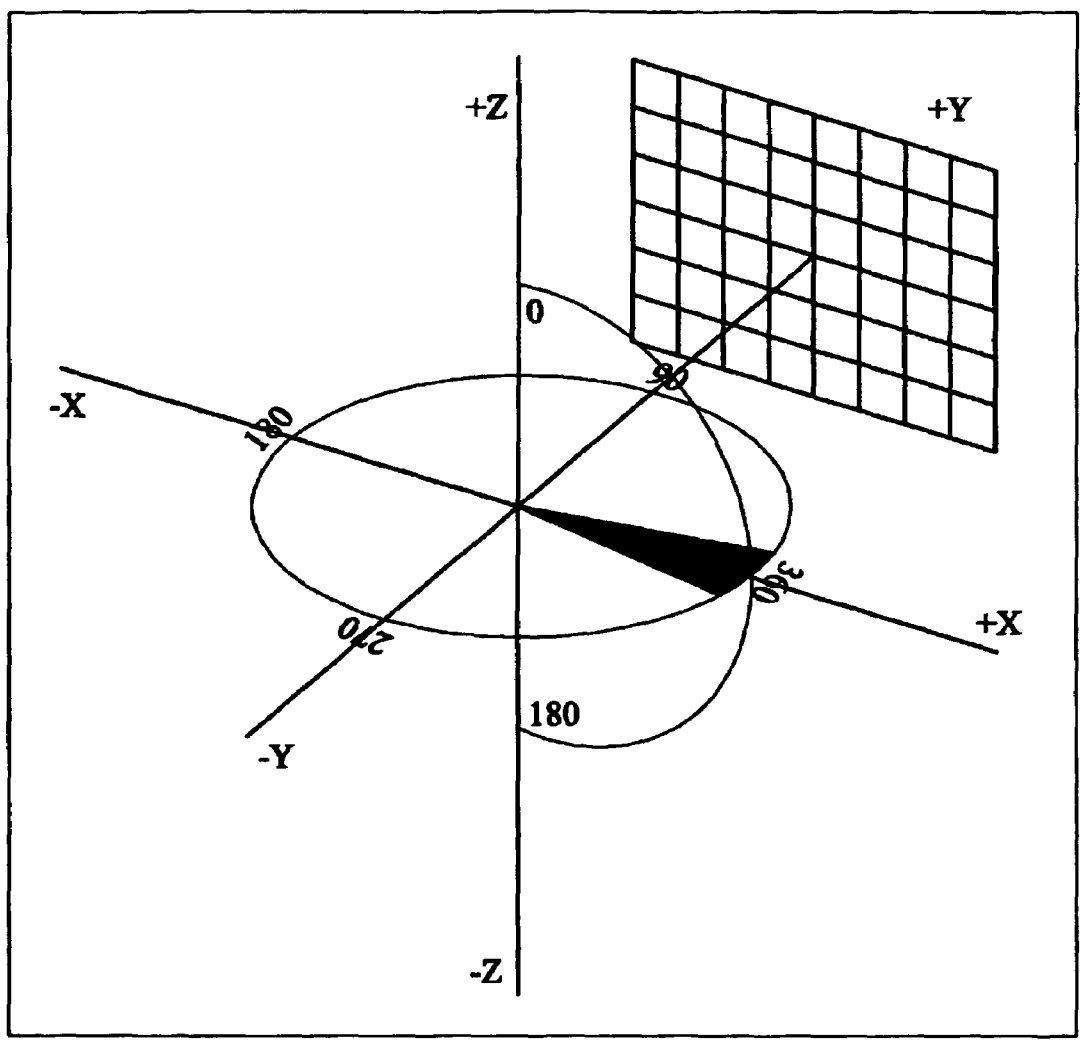
FIG. 5 shows the co-ordinate definitions used for video overlay.

To determine the Cartesian co-ordinates of each measurement point, xm, ym and zm, using the convention shown in FIG. 5, the following equations were used $$xm = r.\sin(tm).\cos(pm)$$

$$ym = r.\sin(tm).\sin(pm)$$

$$zm = r.\cos(tm)$$

A system of co-ordinates common to both the measurement point locations and the video frame rotated from the reference position are used to determine whether the vectors, representing the paths from the measurement points to gamma detector, intersect the operator selected video frame. A rotated co-ordinate system with co-ordinate values for each measurement point (xmr, ymr, zmr) are calculated from their co-ordinates in the reference system (xm, ym, zm). The rotation angles for the transform are vp and vt, the polar co-ordinates of the video frame. The following equations are used to this end:

$$xmr = xm.\cos(vp-90) + ym.\sin(vp-90)$$

$$ymr = -xm.\cos(vt-90).\sin(vp-90) + ym.\cos(vt-90).\cos(vp-90) - zm.\sin(vt-90)$$

$$zmr = -xm.\sin(vt-90).\sin(vp-90) + ym.\sin(vt-90).\cos(vp-90) + zm.\cos(vt-90)$$

The 90° offsets in the above reflect the location of the non-rotated video frame being at (90°, 90°) along the positive y axis. Any points with a negative ymr can be ignored to give a reduced set of measurement points that are tested to determine whether their vectors intercept the selected video frame.

For each measurement point remaining in the reduced set the following calculations should be performed to determine whether the vector from the measurement point to the detector intersects the selected video frame and to calculate its location for subsequent mapping.

To determine the gamma collimator divergence cw at distance ymr and collimator width cfov(n), (note all distances must be in meters) we use $$cw = ymr.\tan(cfo(vn))$$

To determine the forward distance dmr, along the y axis, we use $$dmr = ymr - yoft$$

Where yoff is the parallax offset of the camera in the y direction.

To determine the half-width, wh, of the video frame at the distance dmr, we use $$wh = dmr \cdot \tan\left(\frac{zoom}{2}\right)$$

To determine the x-axis extents of the video frame, xl and xr, we use $$xl = -wh + xoff$$

$$xr = wh + xoff$$

Where xoff is the parallax offset of the camera in the x direction.

To determine frame half-height hb at the distance dmr to give the z-axis extents, zu and zd, we use $$hh = 0.75 \cdot wh$$

$$zu = hh + zoff$$

$$zd = -hh + zoff$$

Where zoff is the parallax offset of the camera in the direction z.

In this context, if $(xl - cw) \leq xmr \leq (xr + cw)$ is false then we reject the measurement and cease further tests on that point.

Furthermore, in this context, if $(zd - cw) \leq zmr \leq (zu + cw)$ is false then we reject the measurement point and cease further tests on that point.

For each of the non-rejected measurement points we determine the position of intersection of measurement vector with the video frame. The origin of the video frame is defined as being in its bottom left corner (w, h=0, 0). Since the size of video frame will vary with the distance from the camera to the measurement point, the location must be defined as a fractional width and height from the origin. In this notation the centre of the frame would be (0.5, 0.5).

The intersection point is therefore $$wm = \left(\frac{xmr - xl}{2 \cdot wh}\right)$$

$$hm = \left(\frac{zmr - zd}{2 \cdot hh}\right)$$

The value of each pixel in the radiometric overlay will be calculated in turn and is given by the following equation, where valp is the value of pixel, p, to be plotted and mi is the radiometric measurement of the ROI chosen and may be any of the possible measurement types (corrected or others), wi is mi's weight for that pixel.

$$valp = \frac{\sum_i (mi \cdot wi)}{\sum_i wi}$$

The colour corresponding to that value, valp, will be chosen from the table of displayed colours ranging from a manually set minimum to a manually set maximum.

The weight for the pixel is determined by,

If dist>(ID)(n)/zoom for collimator n then, wi=0 else, $$wi = \left(\frac{ID(n)}{zoom} - dist\right) \cdot \left(\frac{zoom}{ID(n)}\right)$$

Where dist is the distance between the pixel p and the measurement point m.

$$dist = \sqrt{(wp - wm)^2 + \left(\frac{3}{4}(hp - hm)\right)^2}$$

where wp and hp are the fractional positions of the centre of a pixel in width and height respectively.

The result is more accurate overlaying of the radiometric measurements with the video image, whilst using a technique which allows quick reevaluations of the radiometric measurements for any change in video image selected.

To assist in the understanding of the above mathematical explanation of video overlay, a further explanation of the manner in which the parallax aspect is handled is now provided graphically.

Figure 7:
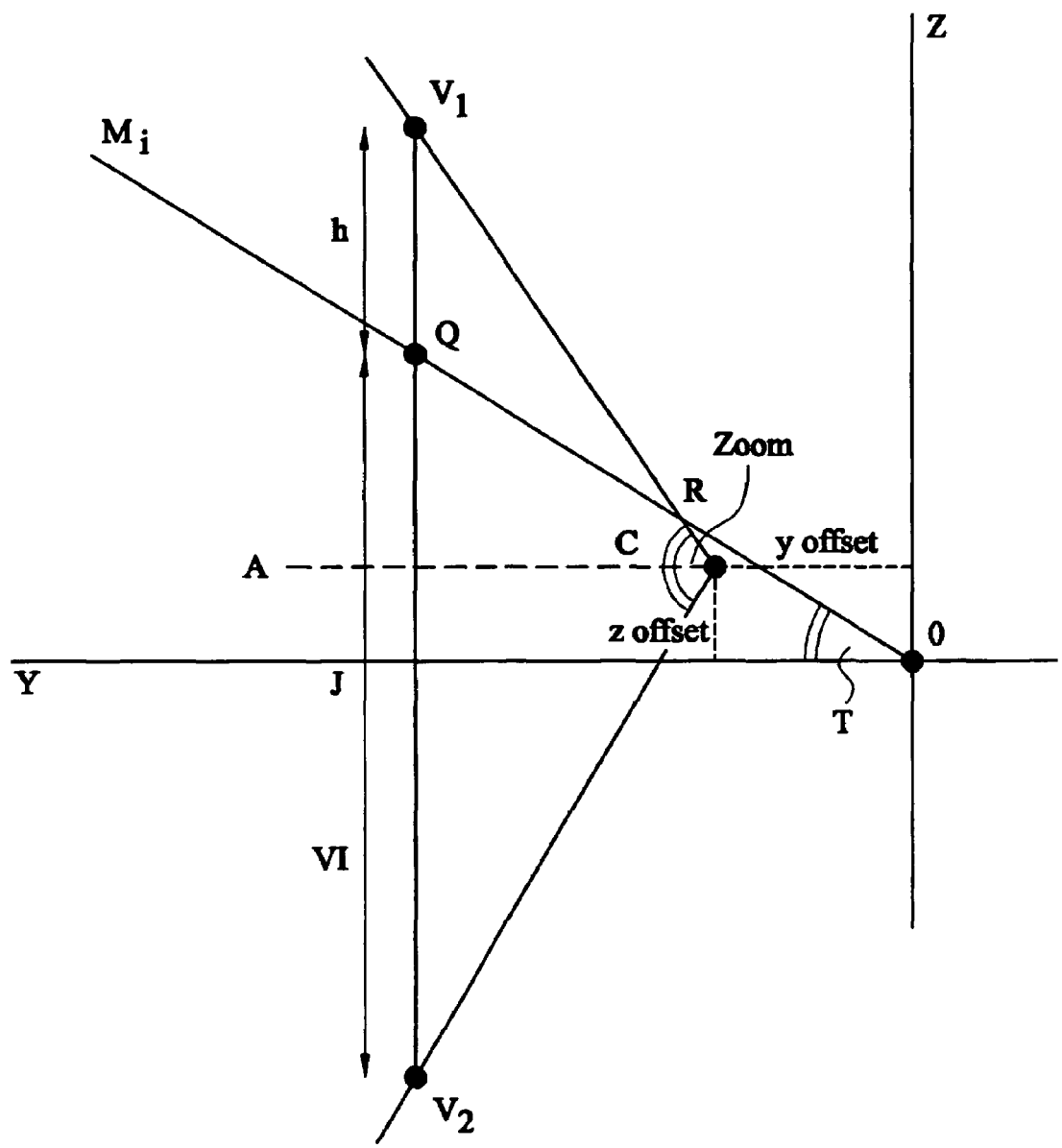
FIG. 7 is an illustration of the accounting for parallax.

Referring to FIG. 7 a two dimensional explanation of the process is provided. The detector of the radiation is represented by point O on Y and Z axis. Offset from point O by a known Y offset and Z offset is the camera position C.

As illustrated by its centerline only, a field of view for the radiometric detector is provided thereby forming measurement point $M_I$. The tilt angle T is known from the tilt angle of the instrument head when this measurement point was taken. Also known is the range to the surface on which the radiation is deemed to have arisen from, range R. This gives a direction and range for the radiation which forms measurement point $M_I$, in this case point Q.

Also represented in the Figure is the field of view of the camera C, defined by the zoom angle, zoom.

By introducing a virtual image plane VI perpendicular to the centre axis of the camera, dotted line A, and with the virtual image plane intersecting point Q then the position of point Q on the visual image is defined by the ratio of the distance between Q and one limit of the virtual image, distance H, between point Q and point V1 and between point Q and point V2 as defined in terms of distance J.

This process is basically repeated for all measurement points, M1 to MN, for which the distance R is positive and which as a result indicates that the point is from a view in front of the camera and hence is a potential candidate for being within the video image bounds.

By accounting for the parallax for all possible measurement points in this way and by plotting those correctly relative to the video image which are within the video image, and accurate overlay of the two data sets is achieved whilst maximizing the amount of information included in the overlay from the radiometric information site.

To account for three dimensional offsets (in front, to the side and above, for instance) the above principal is extended to include the third axis.

The presentation of the video image, geometric and radiometric data in the data processing phase is identical to that in the data acquisition phase.

In basic terms the radiometric data is displayed as false colours overlaying the video frame. The colours are opaque and can be selected from a pallet to meet operator requirements. A range of ten colours is generally used but a pseudo-continuous pallet of colour can also be implemented. The scale for the count rate to colour information is displayed alongside the image to allow user interpretation. Points which are below the minimum count rate are not coloured. Points which exceed the maximum level will be in the colour of the maximum value. The range of the scales can be varied as desired by the operator.

To avoid the implication of a false zero, those areas within the video image for which there is no or inadequate radiometric data are distinguished from those for which measurement has occurred. This is achieved by inhibiting the green contribution to the colour signal, thus giving those regions a magenta shade on the video image.

2D Plots of Radiometric Measurements

To obtain such plots the data may be sourced from the Access™ database and fed to a further piece of software, for instance a macro program written in Excel™ software. The software may accommodate the presentation on a video screen of the 2D plot using a rectilinear array of data points radiometric measurements which are non-rectilinear in their inter-relationship, for instance as occurs when optimised sampling regimes for the environment are employed.

As previously discussed, when surveying an environment, it is important to ensure that all parts of the environment are adequately imaged both from a visual and radiometric sense. In effect, the internal surface of a sphere is being considered by way of a number of flat images. The sampling techniques described above ensure that such spheres are sampled in an efficient and yet effective manner.

A by-product of this more effective sampling regime is that the measurement points for which data is obtained do not equate directly to a 2-dimensional rectilinear array of data points as might be used to process and present the information subsequently. As a consequence it is highly beneficial to incorporate data processing which accounts for this variation with pan and tilt configuration when generating the presentation of radiometric data. Because of this the scan data cannot be transferred directly to Excel for conversion into a plot. A routine is needed to produce a 2-dimensional array of values on a regular grid. This array can then be used to produce the automatic scan contour plot discussed below. The calculations and graph are made using the spherical polar coordinate system used to define the pan and tilt angle of the radiation detector to the operator. The methodology closely follows that outlined above in relation to the video overlay aspect.

To achieve the manipulation the following data is required:—

| Variable | Description | Type |
|---|---|---|
| The scan file | Contains pan, tilt, count rate and range values | Measured |
| Scan type | Is it a normal, corrected, or dose scan | Measured |
| ROI name | The name of each ROI | Measured |
| Nscan | The number of measurement points in the scan | Calculated |
| ID(n) | The interpolation distance for collimator n | Constant |
| PI(n) | The plotting interval for collimator n | Constant |
| wt | The weight threshold | Constant |
| DV | The default value | Constant |

In practice, the user will recall a previously performed scan and select the ROI for which the contour plot is to be generated.

The part of the environment being considered is made up of a substantial number of measurement points. These measurement points and their associated data form the scan file. Initially a search is made of all pan and tilt values within the scan file to find the maximum and minimum of both the pan and tilt values, designated MaxScanPan, MaxScanTilt, MinScanPan, MinScanTilt. These values should be rounded using the respective algorithms below.

$MaxScanPan=PI(n)*(0.99+INT(MaxScanPan/PI(n)))$ $MaxScanTilt=PI(n)*(0.99+INT(MaxScanTilt/PI(n)))$ $MinScanPan=PI(n)*INT(MinScanPan/PI(n))$ $MinScanTilt=PI(n)*INT(MinScanTilt/PI(n))$ These four values determine the extents of the 2D array. Data is plotted on the horizontal axis of the array between MinScanPan and MaxScanPan in steps of PI(n). Data is plotted on the vertical axis of the array between MinScanTilt and MaxScanTilt in the steps of PI(n). An area of a worksheet should be labeled with these values. The data that is produced can be up to about 350 points "wide" in pan and 180 points "high" in tilt. As each worksheet in Excel can only handle data sets of up to 256 points wide it is necessary to present the data with tilt running across a worksheet and pan running down the worksheet.

The full list of variables for the plotting routine are set out below.

| Variable | Description | Type |
|---|---|---|
| Weight ( ) | Weight of plotted values | Calculated |
| WeightVal( ) | Weight value products | Calculated |
| PlotValue( ) | Plotted values | Calculated |
| ScanPan | Plotted pan angle in operator's co-ordinates | Constant |
| ScanTilt | Plotted tilt angle in operator's co-ordinates | Constant |
| MaxScanPan | Maximum plotted pan angle | Calculated |
| MaxScanTilt | Maximum plotted tilt angle | Calculated |
| MinScanPan | Minimum plotted pan angle | Calculated |
| MinScanTilt | Minimum plotted tilt angle | Calculated |
| DX | Plotting distance | Calculated |

As a result the data points are now conducive to representation in a two dimensional manner.

The number of data points for which radiometric information exists as a result of the measurements is only a fraction of the total number of points in the array. As a consequence the radiometric information for each of these points within the arrays still needs to be calculated. To do this a weighted interpolation process is used.

Figures 8A, 8B:
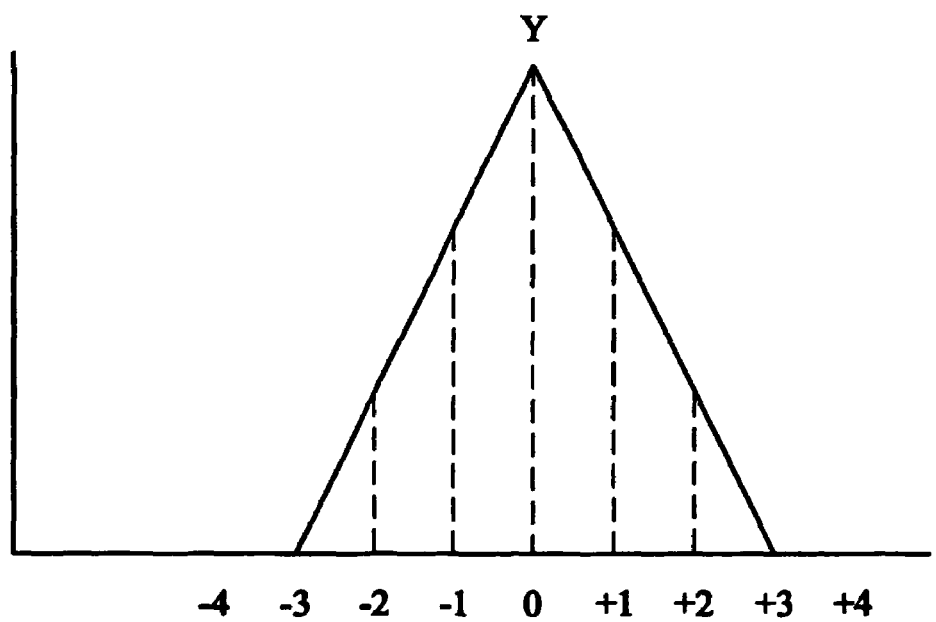
FIG. 8*a* is an illustration of a 2D array showing both measured radiometric information and interpolated radiometric information.
FIG. 8*b* is an illustration of the weighting applied in the process discussed in relation to FIG. 8*a*.

Considering FIG. 8a a part of a 2D array is shown featuring points X for which radiometric measurements exist and points Q for which interpolation is required. To obtain a value for point $Q_1$ the values for points $X_1, X_2, X_3$ and $X_4$ need to be considered. Their values and the relative weighting which should be applied is considered.

In FIG. 8b an illustration of the collimator function is provided. In basic terms a measurement point Y at the apex of the function contributes fully, whereas those one measurement point to the side of Y contribute less, those two measurement points to the side of Y contribute even less and those three or more to the side do not contribute.

In the context of FIG. 8a and $Q_1$ in particular, therefore, $X_1$ makes a higher contribution to the value of $Q_1$ than $X_2$ does, but $X_3$ and $X_4$ do not contribute at all.

This process is described in more detail below.

The radiometric value for each point in the array can be considered as PlotValue (ScanPan, ScanTilt) where ScanPan and ScanTilt are bounded by the algorithms above and each have values increasing in increments of PI(n). PI(n) is not necessarily an integer.

The following data is required from the Scan File where x runs from 1 through to Nscan.

pan(x)—the pan of measurement point x, in the operator's coordinates tilt(x)—the tilt of measurement point x, in the operator's coordinates value(x)—the measured value at each scan points that is to be plotted (either ROI1, ROI2, ROI3 or a new post-process set ROI)

range(x)—the calculated range at point x

Two arrays, Weight(ScanPan, ScanTilt) and WeightVal (ScanPan, ScanTilt) are used to produce the array PlotValue (ScanPan, ScanTilt).

These two arrays are determined by working through all x measurements in the scan file, using the algorithms below.

For a given position ScanPan, ScanTilt within the array:—

Weight(ScanPan,ScanTilt)=Σ[ID(n)−D(x)]/ID(n).

and

WeightVal(ScanPan, ScanTilt)=Σ[ID(n)−D(x)]*value(x)/ID(n)

where both summations are over all x, and where:—

$$D(x) = \sqrt{\left(\frac{(ScanPan - pan(x))}{1/\cos(tilt(x))}\right)^2 + (ScanTilt - tilt(x))^2}$$

Subject to D(x)=ID(n) if either D(x)>ID(n) or if range(x) is invalid.

PlotValue(ScanPan,ScanTilt) is then given by:—

$$PlotValue(ScanPan, ScanTilt) = \frac{WeightVal(ScanPan, ScanTilt)}{Weight(ScanPan, ScanTilt)}$$

except when, Weight(ScanPan,ScanTilt)<WT then PlotValue(ScanPan,ScanTilt)=DV.

The array PlotValue(ScanPan,ScanTilt) information is then written to the spreadsheet such that the data is correctly associated with the measurement points on the 2-D plot which represent it.

The "contour" plot of the data should be plotted, this is one of the standard formats of graph within Excel 97. The graph should be plotted such that pan data is plotted across the landscape graph (with minimum on the left), and with tilt running up and down the graph (with minimum at the bottom). The following default formatting/options should be applied:—

Title=Type of scan (Count Rate/Corrected Count Rate/Rapid Dose)

Sub-title=name of ROI (if applicable)

X-axis title="Pan angle (degrees)"

Y-axis title="Tilt angle (degrees)" should run vertically up the page

All default options for axes/scaling and legends should be accepted.

As a result, the radiometric information presented for any point in the resultant 2D array is a more accurate and true reflection of the radiometric measurements made.

Presentations and Uses 2D contour plots—The results processed using the Excel spreadsheet may be graphically presented on the video display 116 of the data processing computer 104 in terms of a 2D contour plot for all the measured points and all the interpolated points. Generally this will relate to the count for an ROI. The plot is more evenly sampled than through previous techniques.

Post acquisition ROI setting—The counts in the three regions of interest generally recorded in the database will be directly available to the operator from the data recorded on CD-rom. However, the post processing facility of the present invention allows the acquired data to form new ROI count rates defined by the operator during the data processing phase. A configuration database provided as part of the data processing includes a substantial number of predetermined ROI's relating to particular isotopes of interest. These predetermined ROI'S can be called up and used to generate new count rates from the whole spectrum measurement that was made and recorded. Alternatively bespoke ROI's can be defined and count rates extracted from the whole spectrum recorded.

This feature allows different isotopes to be investigated during the post-processing than were originally anticipated as being of interest during the data acquisition stage. Prior art instruments would require an entire new scan using the appropriate regions of interest, to obtain this information. The feature also extends to considering different energies for a particular isotope than the energy originally being considered when the data acquisition was set up.

Virtual scan—It is possible to reproduce the actual scanning operation achieved during the data acquisition phase. The operator can thus call upon the data processing computer 104 to generate video images and radiometric images corresponding to each of the measurement points considered during data acquisition. The operator can move between different images of the scan using cursor keys, mouse operation or the like. Operation of this type allows the whole scan to be reviewed or more particularly allows the operator to move to a particular video frame or frames and consider the radiometric information arising therefrom. In general, the video image of interest will be selected first, and then the operator will request an overlay of the radiometric information. The available data is then called up, for the selected region of interest, and overlaid with the video frame. This data will include radiometric information for a large number of fields of view besides that associated with the centre of the image.

Post Acquisition Hot Spot Scan—It is possible for the operator to enter a selected ROI and specify a threshold count rate for during post processing. The data processing computer 104 will then scan through the radiometric information it has and display a list of measurement points at which the count rate in the region of interest exceeds the threshold. This data would include pan and tilt angles, the count rates, their errors and the range before that measurement point. The operator can then select a measurement point from the list to be displayed, or can choose to view them sequentially. In either case, the video image corresponding to the measurement point is displayed and then an overlay may be requested to display the radiometric information on it. Again a large number of fields of view and their associated radiometric information could be overlain in this way.

If desired a thumb nail video image can be displayed alongside each measurement point featuring in the list of points at which the count rate exceeds the threshold set for the ROI.

Figure 9B:
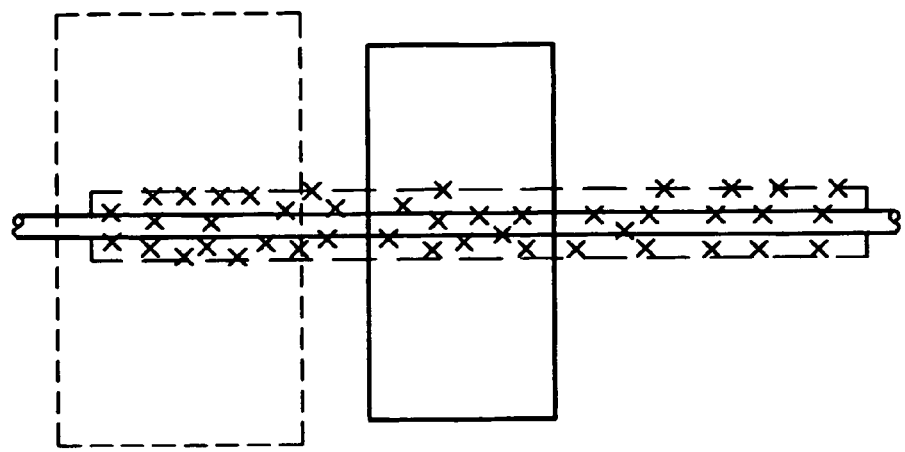
FIG. 9*b* is a schematic illustration of possible operation of the present invention.
Figure 9A:
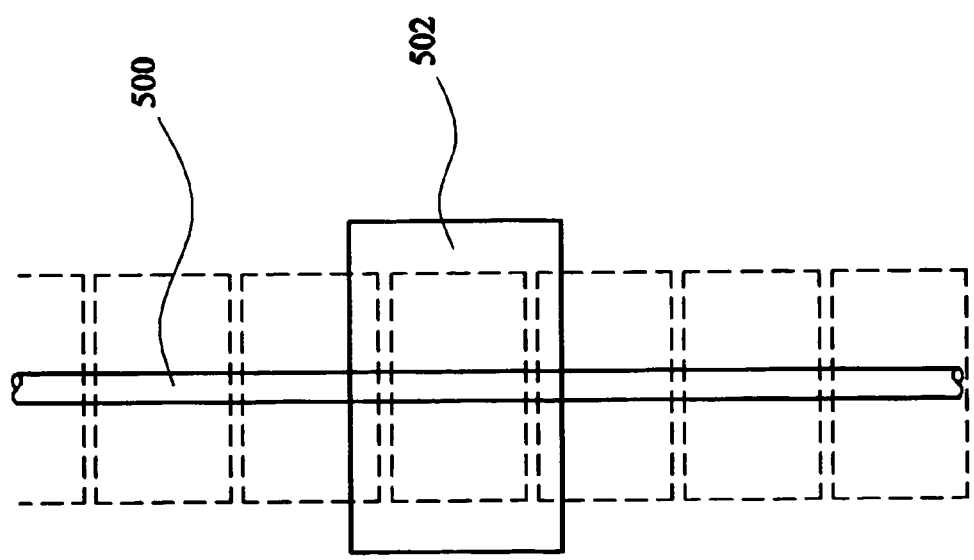
FIG. 9*a* is a schematic illustration of RADSCAN™ 700 operation.

Targeting locations—In FIG. 9*a* an elongate pipe 500 is shown which in part runs behind a plate 502. To investigate this pipe using existing systems the length of the pipe 500 needs to be considered from the point of view of radiometric information as fully as possible, but without wasting large amounts of time on fields of view which only feature the wall behind. As a consequence the image size needs to be as small as reasonably possible. At the same time it is desirable to be able to cover the length of the pipe in as few video images as possible to avoid long measurement times. These conflicting aims point to the given image size used and illustrated in FIG. 9a by dotted lines; all the images taken are shown. To keep the number of views as low as possible within such constraints it is desirable to have the minimum level of overlap.

A by product of this approach in the case seen in FIG. 8a is that the video image in the region of the plate 502 is uninformative as it lacks any reference points.

In the FIG. 8b illustration the same pipe 500 is being considered using the present invention. In this case it is possible to set the area for radiometric information gathering by defining the bounds of the area, marked by the dot dash lines. This results in the measurement points marked by X's being considered. As a result the radiometric information is only gathered for the necessary area and no wasteful measurements occur. The video image size can, however, be set independently and so a size of image is selected to give a meaningful impression over the length of the pipe, see dotted line, even where the plate 502 is being considered. Furthermore, a video image is taken at each of the measurement points X.

Variations in measurement consideration—As the raw data recorded and available for post processing includes the actual count rates it is possible to undertake a variety of adjustments and generate further results as a consequence. For instance, it is possible to obtain range adjusted measurements. It is possible to present the measurements in a normalized form; their level relative to a reference level. Other possible adjustments and/or combinations of the results with data from other sources are possible.

The invention claimed is:

1. A method for obtaining information about radiation arising from within an environment, the method comprising:
    providing a directionally sensitive radiation detector which has a field of view;
    providing a visual image capturing device which has an area of vision;
    conducting a measurement of the radiation for a field of view, the field of view including a part of the environment;
    recording the measurement of radiation together with an indication of the spatial position of the respective field of view relative to the detector;
    obtaining a visual image of an area of vision, the area of vision including the part of the environment within the field of view and recording that image together with an indication of the spatial position of that field of view relative to the detector; and
    selecting after completion of the measurement of radiation, a set of data from the measurement of radiation according to a criteria, the criteria also being set after completion of the measurements of radiation; and
    overlaying information from one or more of the measurements of radiation with one of the visual images.

2. A method according to claim 1 in which the set of data is selected after the measurements of radiation have been recorded to a writeable medium.

3. A method according to claim 1 in which the selection of the set of data occurs after the measurements of radiation have been conveyed from the instrument to a remote data processing location.

4. A method according to claim 1 in which the criteria is one or more energy ranges for radiation.

5. A method according to claim 1 in which the criteria is count rates of a threshold value or higher.

6. A method according to claim 1 in which an indication is provided as to those fields of view for which the criteria are met, the indication being a numerical indication or a visual indication.

7. A method for obtaining information about radiation arising from within an environment, the method comprising:
    providing a directionally sensitive radiation detector which has a field of view;
    providing a visual image capturing device which has an area of vision;
    providing the directionally sensitive radiation detector and the visual image capturing device on a pan and tilt unit in sight of at least part of the environment;
    specifying a portion of the environment to be considered;
    conducting a measurement of the radiation in each of a plurality of fields of view, each field of view being centered on a measurement point, the measurement points having a predefined spatial position relative to the detector, at least those measurement points falling within the specified portion of the environment being used for a measurement, each field of view including a part of the environment within the specified portion, all parts of the portion of the environment being considered being included in at least one field of view;
    recording the measurements of radiation together with an indication of the spatial position of the respective field of view relative to the detector;
    obtaining visual images of one or more areas of vision, the areas of vision including all of the specified portion of the environment being included in at least one of the areas of vision and those images being recorded together with an indication of the spatial position of the areas of vision; and
    information from one or more of the measurements of radiation being overlaid with one or more of the visual images.

8. A method according to claim 7 in which the measurement points have predefined spatial positions relative to an equatorial plane.

9. A method according to claim 8 in which the measurement points have predefined spatial positions relative to a plane at 90° to the equatorial plane.

10. A method according to claim 9 in which an initial point is defined on the intersection of the equatorial plane and the perpendicular plane and the other points are predefined relative to that point by the relationship interval in pan in degrees equals scanning pitch in degrees divided by sin t, where t is the tilt angle relative to the equatorial plane.

11. A method according to claim 7 in which all those measurement points falling with the specified portion of the environment are used for a measurement.

12. A method according to claim 7 in which measurements are performed for one or more points adjacent to the specified portion.

13. A method according to claim 10 in which all those measurement points falling with the specified portion of the environment are used for a measurement.

14. A method according to claim 10 in which measurements are performed for one or more points adjacent to the specified portion.

* * * * *